United States Patent [19]
Womack

[11] Patent Number: 4,963,984
[45] Date of Patent: Oct. 16, 1990

[54] OPTICAL PROJECTION CAMERA ALIGNMENT SYSTEM AND METHOD

[75] Inventor: Kenneth H. Womack, Rochester, N.Y.

[73] Assignee: Eastman Kodak Company, Rochester, N.Y.

[21] Appl. No.: 349,744

[22] Filed: May 10, 1989

[51] Int. Cl.$^5$ .......................................... H04N 5/225
[52] U.S. Cl. .................................... 358/225; 358/209; 358/60
[58] Field of Search ................. 358/209, 225, 10, 139, 358/60, 231, 83

[56] References Cited

U.S. PATENT DOCUMENTS

| | | | |
|---|---|---|---|
| 3,928,717 | 12/1975 | Dorland | 358/83 |
| 4,326,219 | 4/1982 | Griesshaber | 358/139 |
| 4,591,918 | 5/1986 | Hisano | 358/225 |
| 4,649,324 | 3/1987 | Guerra et al. | 358/10 |
| 4,755,869 | 7/1988 | Tanaka | 358/209 |
| 4,779,136 | 10/1988 | Corley | 358/209 |

*Primary Examiner*—Stephen Brinich
*Attorney, Agent, or Firm*—Edward Dugas

[57] ABSTRACT

An optical projection camera alignment system and method particularly adapted for a solid state image sensor array type cameras such that a high intensity light source is directed onto the image sensor array to effectively project the image of the image sensor array out of the camera, through its lens systems, onto an object plane. The focus and angular orientation of the camera is then adjusted to accurately focus and align the image of the camera's image sensor array with respect to the object plane. In multiple camera installations the overlap and relative alignment of neighboring camera's fields-of-view can be set at desired levels. In a preferred apparatus embodiment of the invention, a pair of fiber optic bundles each having a right angle prism affixed to one end is inserted into the camera body and the cavity between the lens system and the image sensor array. A light source is coupled to the opposite ends of the pair of fiber optic bundles for generating light which is passed through the fiber optics and dispersed onto the surface of the image sensor array by the right angle prisms.

6 Claims, 2 Drawing Sheets

OPTICAL PROJECTION CAMERA ALIGNMENT SYSTEM AND METHOD

BACKGROUND OF THE INVENTION

1. Field of the Invention

The present invention relates to the alignment and focusing of a camera with respect to an object plane and, more particularly, to the alignment and focusing of a camera with a solid state image sensor with respect to a desired location on an object plane.

2. Description of the Prior Art

A major problem in applying, for example, linear array type cameras for copy work have historically been the alignment of the camera so that the camera's measurement line or sensor line is positioned as desired at the object. To locate the measurement line users have often resorted to probes or specially designed targets. With these tools the user will generally observe the camera signal and try to locate a few points along the measurement line and the ends of the line. Unless great care is exercised, this is difficult to do. Some camera manufacturers have resorted to optical viewfinders such as are included in commercial photographic cameras to aid alignment. Unless this viewfinder is precisely constructed itself, including a precision reticle marking the measurement line, the viewfinder is of little value for other than coarse alignment.

A patent of interest for its teaching is U.S. Pat. No. 3,992,108, entitled "Optical System Alignment Apparatus" by W. L. Kidd et al. In that patent there is disclosed a pair of scan lamps which are used in an electrophotographic printing machine. The scan lamps are mounted in a housing which is moved from one position to another to form an overall image. An alignment member is placed on the housing containing the scan lamps and the light reflected from the alignment member is projected onto an indicating means. Alignment of the scan range of the scan lamp can then be adjusted by observing the projected alignment member's image onto a centrally located calibration mark on the indicating means.

Another patent of interest for its teaching is U.S. Pat. No. 4,084,184, entitled "TV Object Locator and Image Indentifier" by D. W. Crain. In that patent the alignment of a TV camera having a lens axis is accurately aligned to an object by determining through, for example, acoustical sonar, the accurate position of the object and then determining the axis of the TV lens and controlling the position of the TV axis to correspond to the position of the object.

In U.S. Pat. No. 4,280,135 entitled "Remote Pointing Systems" by H. R. Schlossberg there is disclosed a system which permits a lecturer to use a laser beam pointer projected onto a projected image to highlight areas to be emphasized in a presentation. The pointer position can then be transmitted to either locations where the projected image is being viewed so that audiences at multiple locations can see the same presentation as that seen at the original location.

SUMMARY OF THE INVENTION

In a preferred embodiment of the invention there is provided a camera body having an image sensor array mounted in the camera body and having an alignment pattern thereon. A lens system is coupled to the camera body for focusing onto an object plane. A means is provided for directing light onto the image sensor array to project the alignment pattern through the lens system onto the object plane to facilitate alignment and focusing of the camera with respect to the object plane.

For many solid state sensors the various gate and mask structures that make the sensor function are a suitable alignment pattern. In some cases the light-active photosites of a sensor can be directly identified in the projected image of a sensor.

From the foregoing it can be seen that it is a primary object of the present invention to provide an improved camera alignment system.

It is a further object of the present invention to provide an improved optical projection camera alignment and focusing system.

It is yet another object of the present invention to provide a simple method of aligning and focusing a solid state camera to an object plane.

In addition, the present invention provides a simple method for checking the field of-view overlap and alignment in multiple camera installations.

These and other objects of the present invention will become more apparent when taken in conjunction with the following description and drawings wherein like characters indicate like parts and which drawings form a part of the present disclosure.

DESCRIPTION OF THE PREFERRED EMBODIMENTS

Figure 1:
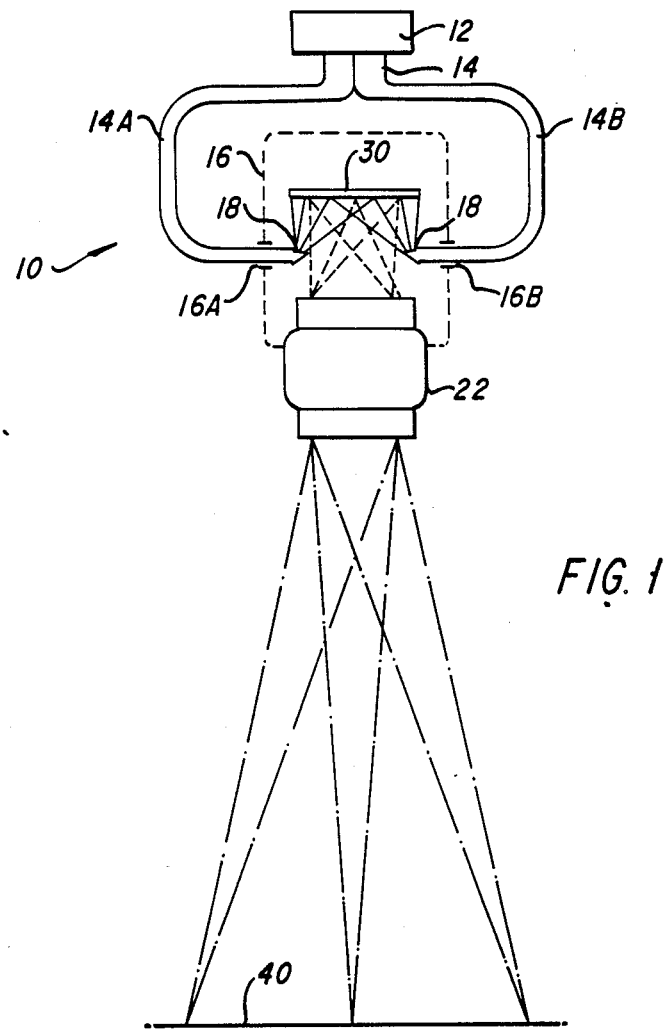
FIG. 1 is a schematic diagram of the preferred embodiment in alignment position with respect to an object plane.

Referring to FIG. 1, the optical projection camera alignment system of the present invention is shown comprised in part of a light source 12, coupled to a fiber optic bundle 14 at one end, which bundle is bifurcated into two segments 14a and 14b. It is understood that other approaches could be taken to flooding the sensor with light. For example, a laser diode or other light source might be built into the camera. The ends of the bundles are directed through openings 16a and 16b within a camera body 16 (See FIG. 3). At each end of the bifurcated fiber bundles is positioned a right angle prism 18 or folding mirror. The prisms are positioned such that they illuminate, with the light from the light source 12, the surface of a solid state sensor array 30 which may be a solid state linear array. The light impinging on the surface of the array 30 is projected therefrom through a lens system 22, affixed to the camera body 16 and outwards onto an object plane 40 so as to project an image of array 30.

An operator observing the projected image of the sensor is able to align and to focus the camera so as to correspond the position of the projected image of the array to the desired area of the object plane containing the image to be captured by the camera.

Figure 2:
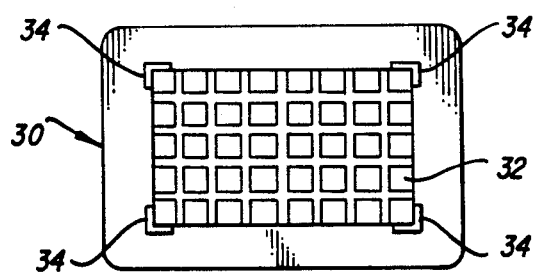
FIG. 2 illustrates an example pattern of a solid state sensor used in the preferred embodiment of FIG. 1.

Referring to FIG. 2 an example of a solid state image sensor array is shown comprised of a plurality of photosensitive elements 32 which by their array positioning make up a grid pattern which pattern is the pattern that is projected by the FIG. 1 embodiment. It is also possible where the sensor pattern is not predominant to apply additional marking indice such as is indicated by the corner alignment marks 34. Although one form of image sensor array 30 is shown by way of example, it is understood that different shapes and/or configurations may be used incorporating the teachings of the present invention.

Figure 3:
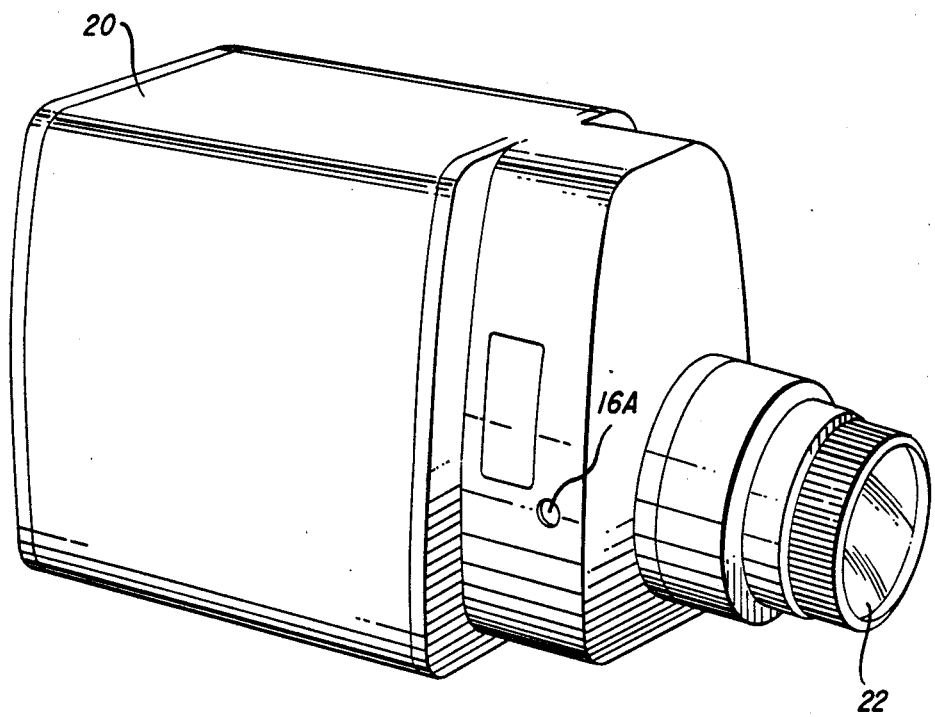
FIG. 3 illustrates a camera incorporating the present invention.

FIG. 3 illustrates a camera having a body portion 20 with a lensing system mounted to the body and with the openings 16 being formed between the lensing assembly and the image sensor (not shown). The method of the present invention for aligning the camera to an object plane is thus to position the camera within the field of view of the object plane and to direct a light beam into the camera so to project the image of the camera's image sensor array back through the camera's lens onto the object plane and to align the camera in response to the viewed projected image of the image sensor array.

While there has been shown what are considered to be the preferred embodiments of the invention, it will be manifest that many changes and modifications may be made therein without departing from the essential spirit of the invention. It is intended, therefore, in the annexed claims, to cover all such changes and modifications as may fall within the true scope of the invention.

I claim:

1. An optical projection camera alignment apparatus comprising:
   a camera body;
   an image sensor mounted in said camera body and having a pattern thereon;
   a lens means coupled to said camera body for focusing onto an object plane; and
   means for directing light onto said image sensor to project the image sensor pattern through said lens means onto the object plane to facilitate alignment of the camera with respect to the object plane.

2. The optical projection camera alignment apparatus according to claim 1 wherein said image sensor is an array of solid state photodetectors which form said pattern.

3. An optical projection camera alignment apparatus according to claim 1 wherein said means for directing a light beam onto said image sensor is comprised of:
   a source of light;
   at least one right angle prism or folding mirror; and
   at least one bundle of fiber optics having one end coupled to said source of light and its other end coupled to said prism for transmitting light from said source of light to said right angle prism or folding mirror for projection onto said image sensor.

4. An optical projection camera alignment apparatus according to claim 3 wherein said right angle prism or folding mirror is positioned within said camera body intermediate said image sensor and said lens means.

5. A camera alignment and focusing method comprising the steps of:
   (a) positioning the camera within projection range of an object plane;
   (b) directing a light beam onto the camera's image sensor to project the sensor image onto the object plane; and
   (c) aligning and focusing the camera in response to the viewed projected image.

6. A camera alignment and focusing method according to claim 5 wherein multiple cameras are used in an installation in which the spatial relationship and focus of each camera's field-of-view relative to the remaining cameras is directly observed by simultaneous or pair wise projection of sensor images onto an object.

* * * * *